United States Patent
Iwabuchi

(10) Patent No.: US 7,633,911 B2
(45) Date of Patent: Dec. 15, 2009

(54) NETWORK SYSTEM, CONTROL SYSTEM, INFORMATION APPLIANCE, AND PROGRAM

(75) Inventor: Kazunori Iwabuchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1367 days.

(21) Appl. No.: 10/686,707

(22) Filed: Oct. 17, 2003

(65) Prior Publication Data

US 2004/0100933 A1   May 27, 2004

(30) Foreign Application Priority Data

Nov. 25, 2002   (JP)   ............................. 2002-341187

(51) Int. Cl.
*H04W 4/00*   (2006.01)
(52) U.S. Cl. .................... 370/338; 707/102; 315/294
(58) Field of Classification Search ................ 370/338; 707/102; 345/173
See application file for complete search history.

(56) References Cited

U.S. PATENT DOCUMENTS

| | | | | |
|---|---|---|---|---|
| 5,818,428 A | * | 10/1998 | Eisenbrandt et al. | ........ 345/173 |
| 6,122,268 A | | 9/2000 | Okanoue et al. | |
| 2005/0198063 A1 | * | 9/2005 | Thomas et al. | ............ 707/102 |

* cited by examiner

*Primary Examiner*—Albert T Chou
(74) *Attorney, Agent, or Firm*—Brundidge & Stanger, P.C.

(57) ABSTRACT

A network system which includes a plurality of information appliances and a control system. The control system includes a response control device for receiving selection of an information appliance and response instructions from a user and sending a response command to the selected information appliance. The information appliance includes a response device for implementing a response processing, and an information appliance control device for receiving a response command to have the response device implementing a response processing.

22 Claims, 11 Drawing Sheets

NETWORK SYSTEM, CONTROL SYSTEM, INFORMATION APPLIANCE, AND PROGRAM

BACKGROUND OF THE INVENTION

The present invention relates to a network composed of a plurality of information appliance, and more particular, to a network enabling a user to readily recognize physical positions of the respective information appliance.

Computer networks become widespread and LAN's (Local Area Network), to which a plurality of information appliance, such as computers, printers, or the like are connected, are built in may offices. Also, domestic networks, that is, so-called home information appliance have been gradually generalized.

Further, it is expected that not only computers, printers, or the like but also all electric appliances have a communication function to be connected as so-called information household electrical appliances to networks in the future.

In such network, intercommunication is made with the use of, for example, Internet Protocol (IP). In an IP network, IP addresses allotted to respective information appliance can be used to identify individual information appliance.

Even when respective information appliance can be theoretically specified with the use of IP addresses or the like, however, it is not possible to recognize which of a plurality of information appliance corresponds to a specified information appliance and where the specified information appliance is physically present.

For example, even when it has proved that an information appliance specified by a certain IP address performs an abnormal processing, it is not easy to specify and deal with a physical position of the information appliance.

In addition, U.S. Pat. No. 6,122,268 (Patent document 1) describes, as a technique of controlling physical positions of information appliance in a network, controlling geographical, positional information of information appliance every sub-network and updating the geographical, positional information in the case where an information appliance move across sub-networks.

However, the technique described in Patent document 1 still takes no account of recognizing which of a plurality of information appliance corresponds to a specified information appliance and where the specified information appliance is physically present in a certain network.

This problem becomes conspicuous particularly in those LAN's in is offices, to which many information appliance are connected, or home networks, to which all electric appliances are expected to be connected as information household electrical appliances.

SUMMARY OF THE INVENTION

An object of the invention is to enable readily recognizing physical positions of information appliance in a network composed of a plurality of information appliances. The information appliance could for example be any one of an information processing equipment, appliance, apparatus, device or the like. Henceforth, for the sake of convenience such apparatus will be referred to as "information appliance".

In order to solve the problem, a first embodiment of the invention provides a network system comprising a plurality of information appliances and a control system, and wherein the control system comprises response control means for receiving selection of an information appliance and response instructions from a user and sending a response command to the selected information appliance, and each information appliance comprises response means for implementing a response processing, and information appliance control means for receiving a response command to have the response means implementing a response processing.

Thereby, it is possible to have the selected information appliance implementing a response processing, so that a user can recognize where a particular information appliance among a plurality of information appliances present in a network system are physically located.

Here, the response means of the information appliance can comprise a lighting device for implementing a lighting-on processing.

Also, the control system further comprises network information storage means for storing information appliance identifying information for identifying the respective information appliance, and network control means for creating image data to display information appliance included in the network system on the basis of the information appliance identifying information stored in the network information storage means, the information appliance further comprises information appliance information storage means for storing information peculiar to the information appliance, when receiving the response command, the information appliance control means sends the information peculiar to the information appliance, stored in the information appliance information storage means, to the control system, and the network control means of the control system can store the received information peculiar to the information appliance, in the network information storage means in connection with the information appliance identifying information of the information appliance, and create image data to display the information appliance included in the network system, adding thereto information peculiar to the corresponding information appliance.

Here, the information peculiar to the information appliance comprises geographical, positional information of the information appliance.

In this manner, geographical, positional information of information appliance is acquired to be displayed on a screen, whereby a user becomes easy to recognize where information appliance present in a network are physically present.

Also, in the case where the response means of the information appliance comprises a lighting device for implementing a lighting-on processing, when receiving selection of an information appliance and particular response instructions from a user, the response control means of the control system sends a particular response command, which contains information for specifying the selected information appliance, to all the information appliance included in the network system, and the information appliance control means can have the response means implementing a lighting-on processing of the lighting device in the case where the information for specifying the information appliance, contained in the received particular response command, is indicative of the information appliance, and have the response means implementing a lighting-off processing of the lighting device in the case except the above case.

Thereby, it is possible to obtain a state, in which an information appliance, of which a lighting device or devices are lighted on, are lighted off and only a specified information appliance is lighted on. Thereby, a user becomes further easy to recognize where a particular information appliance among a plurality of information appliance present in the network is physically located. Also, in the case where results as expected are not obtained, it is easy to find malfunctioning of the lighting devices, or the like, of the information appliance.

Also, in order to solve the problem, a second embodiment of the invention provides a control system for controlling a network system provided with a plurality of information appliance, which comprise response means for implementing a response processing, and information appliance control means for having the response means implementing a response processing, the control system comprising response control means to receive selection of an information appliance and response instructions from a user to send a response command to the selected information appliance.

Further, in order to solve the problem, a third embodiment of the invention provides an information appliance connected to a network controlled by a control system, the information appliance comprising response means for implementing a response processing, and information appliance control means for receiving a response command to have the response means implementing a response processing.

Here, information appliance information storage means for storing information peculiar to the information appliance may be further provided, and when the information appliance are connected to the network, the information appliance control means may send the information peculiar to the information appliance, stored in the information appliance information storage means, to the control system.

DETAILED DESCRIPTION OF THE INVENTION

Embodiments of the Invention will be Described in Detail with Reference to the Drawings.

Figure 1:
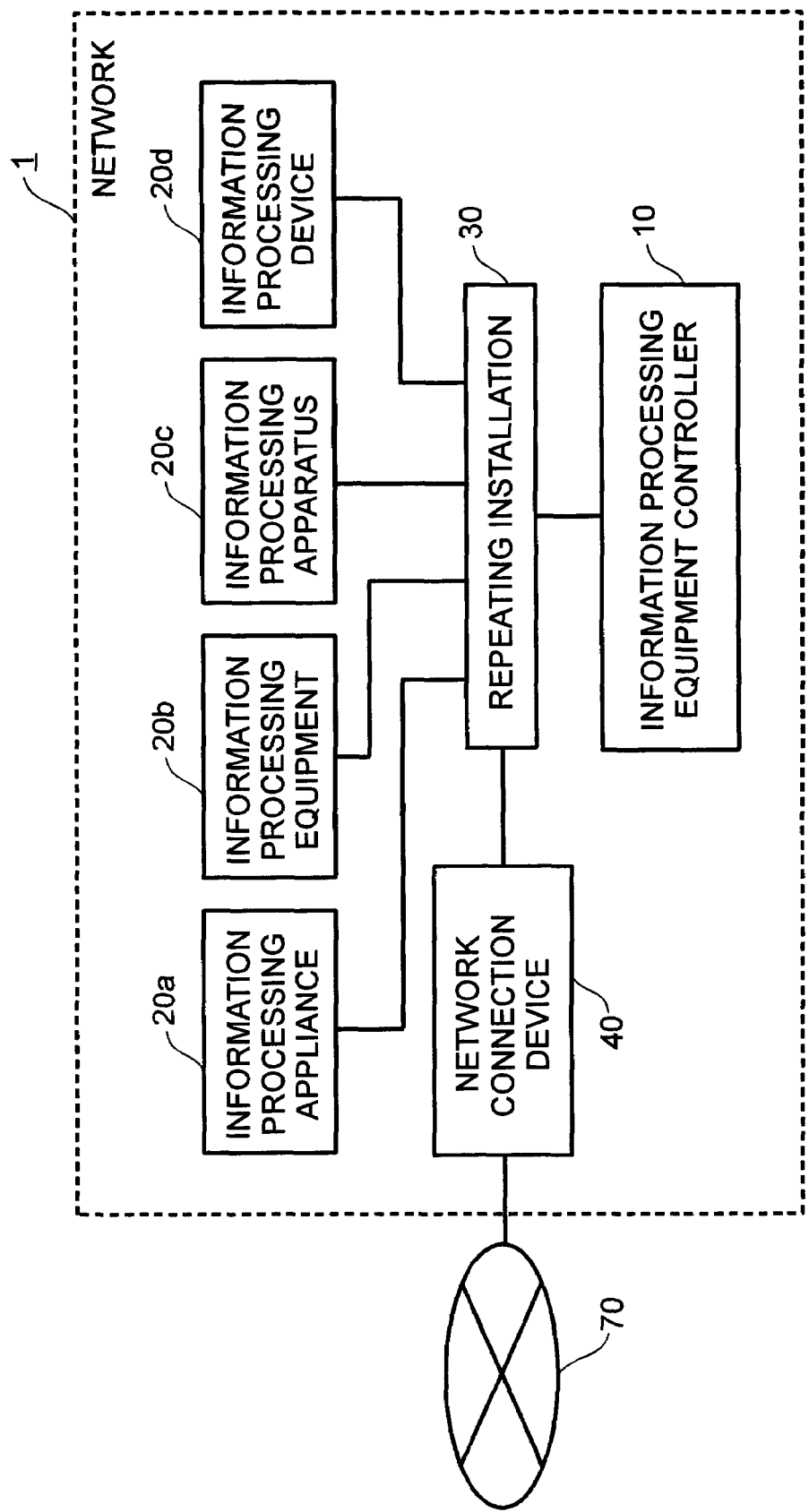
FIG. 1 is a block diagram showing a configuration of a network, to which the invention is applied.

FIG. 1 is a block diagram showing a configuration of a network, to which the invention is applied. As shown in the figure, the network 1 is configured such that a plurality of information appliances 20, each of which performs a processing peculiar thereto, and an information appliance controller 10 for controlling the respective information appliance 20 are connected to each other through a repeating installation 30. The information appliance 20 could for example be any one of an information processing equipment, appliance, apparatus, device or the like. Henceforth, for the sake of convenience such apparatus will be referred to as "information appliance".

The network 1 can be connected to an external network 70, such as Internet, or the like, through a network connection device 40.

That is, the network 1 is constituted as a local network, in which the information appliance controller 10 serves as a control system. Such configuration of the network is typified by, for example, LAN's in offices, home information appliance at home, or the like. However, a configuration of a network, to which the invention is applicable, is not limited to the above.

The information appliance 20 comprises an electrical appliance connectable to a network. The electrical appliance connectable to a network is typified by an information appliance such as computers, or the like. The invention is not limited to such appliance but can constitute an information appliance 20 making use of electrical appliance, that is, so-called information household electrical appliances, such as televisions, refrigerators, telephones, lighting fittings, or the like.

Protocol used in the network 1 will be explained taking IP (Internet Protocol), which is widely used as protocol of a computer network, as an example, but the invention is not limited thereto. Also, strand pair, coaxial cable, optical fiber, and the like, are listed as transmission medium, but they are not limitative. Of course, a wireless system may be adopted.

Figure 2:
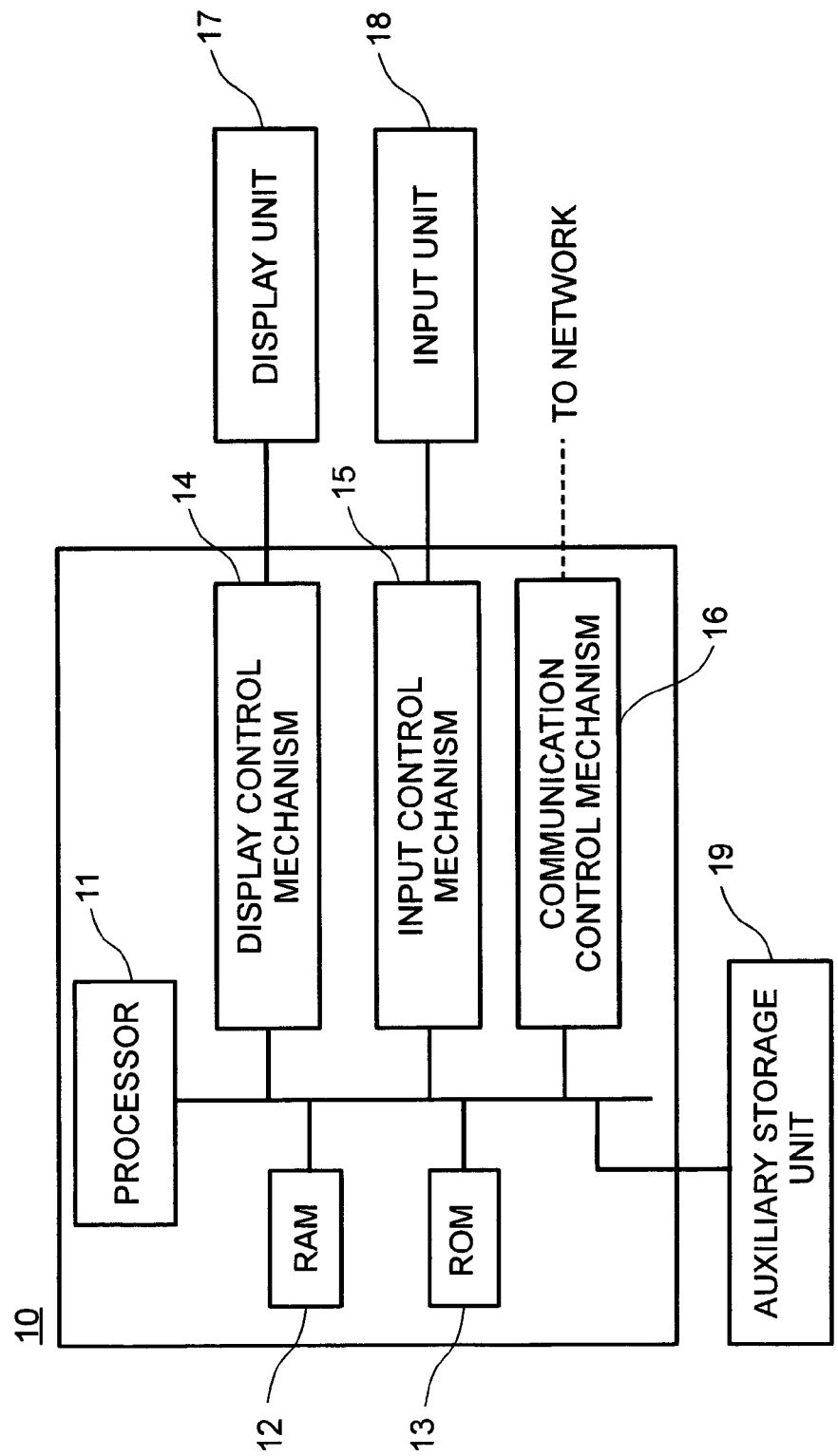
FIG. 2 is a block diagram showing an example of a hardware configuration of an information appliance controller.

FIG. 2 is a block diagram showing an example of a hardware configuration of the information appliance controller 10. As shown in the figure, the information appliance controller 10 can be constituted by general purpose information appliance, for example, personal computers, server computers, work stations, or the like, provided with a processor 11, a RAM 12, a ROM 13, a display control mechanism 14 composed of graphics control chip/video memory, or the like, an input control mechanism 15 composed of interface circuits or the like, a communication control mechanism 16 for performing a processing for connection to a network, or the like. Also, information appliance specialized as a server for home network can be used to constitute a so-called home server.

Connected to the information appliance controller 10 are a display unit 17 such as a display, or the like, an input unit 18 such as keyboard, mouse, or the like, and an auxiliary storage unit 19 such as hard disk, or the like. However, these units may be housed in the information appliance controller 10.

Figure 3:
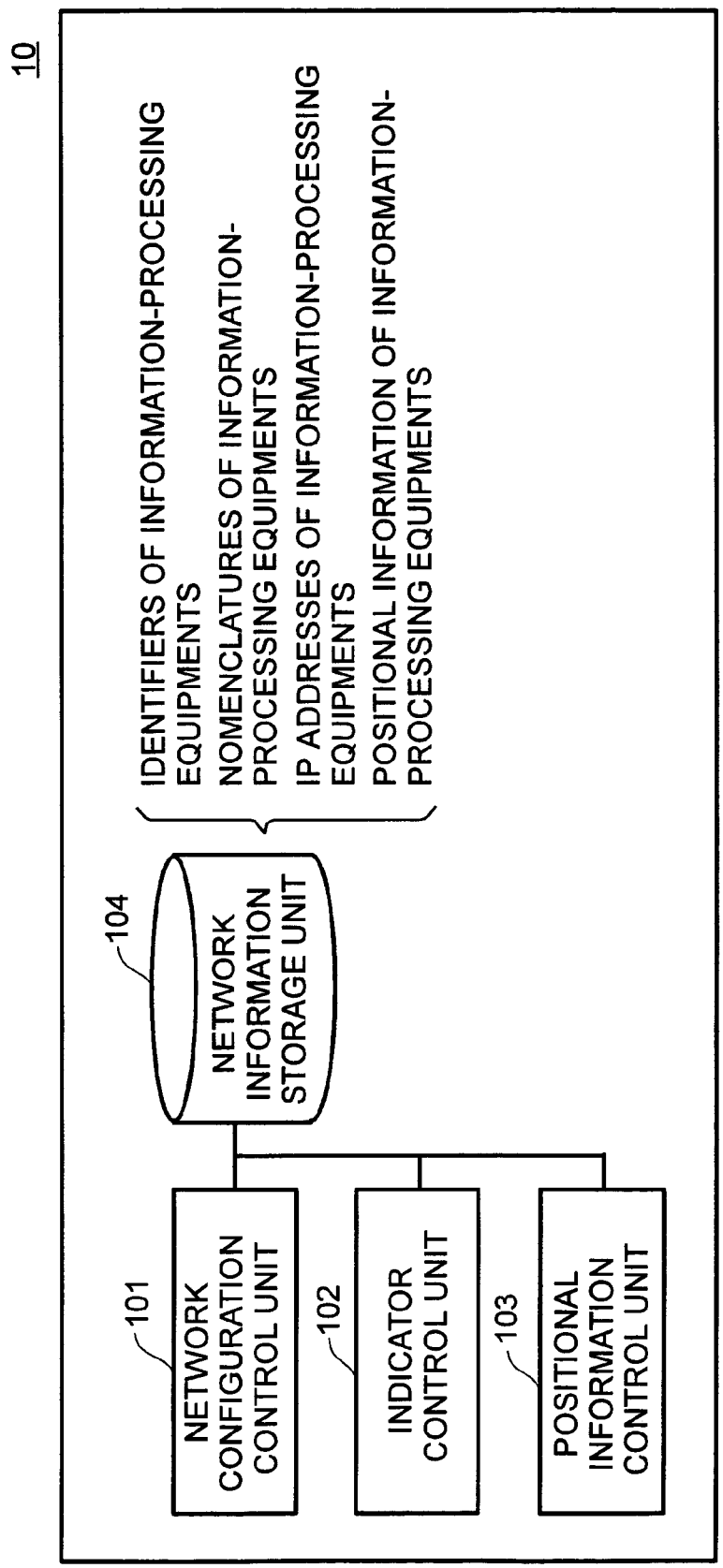
FIG. 3 is a block diagram showing a configuration and function of the information appliance controller.

FIG. 3 is a block diagram showing a configuration and function of the information appliance controller 10. As shown in the figure, the information appliance controller 10 comprises a network configuration control unit 101, an indicator control unit 102, a positional information control unit 103, and a network information storage unit 104.

The network configuration control unit 101 performs a processing for network management of the information appliance 20 in the network 1 controlled by the information appliance controller 10. Characteristically, when the information appliance 20 are connected to the network 1, proper IP addresses are allotted to the information appliance 20 to be related to identifiers and nomenclatures of the information appliance 20 to be stored in the network information storage unit 104. However, instead of allotment of IP addresses by the information appliance controller 10, the information appliance 20 themselves may individually get proper IP addresses, or the information appliance 20 may be beforehand provided with proper IP addresses. Identifiers and nomenclatures of the information appliance 20 are acquired from the information appliance 20 in the case where they are beforehand stored as information in the information appliance 20, and identifiers and nomenclatures of the information appliance 20 are allotted by the network configuration control unit 101, or setting is received from a user in the case where the information appliance 20 do not posses these information.

In addition, identifiers mainly comprise cord information, with which the network configuration control unit 101 identifies individual information appliance 20, and nomenclatures mainly comprise character information, with which a user identifies individual information appliance 20. It suffices that either of identifiers and nomenclatures can identify the respective information appliance 20, and it is not always necessary to use the both.

On the basis of instructions from a user (manager), the indicator control unit 102 sends a lighting-on command or a lighting-off command to indicator units (see FIG. 5) provided in the information appliance 20. The positional information control unit 103 performs a processing for collecting positional information stored in information storage units 24 of the information appliance 20 to display the same on the display unit 17. In addition, the indicator control unit 102 and the positional information control unit 103 will be described later in detail.

The network information storage unit 104 stores, every information appliance 20, information with respect to the information appliance 20 in the network 1 controlled by the information appliance controller 10. Information with respect to the information appliance 20 can include, for example, the IP addresses, identifiers, nomenclatures, and positional information of the information appliance. The positional information control unit 103 acquires the positional information from the information appliance 20 to store the same as described later.

The processor 11 implements a program code read by the RAM 12 to constitute the network configuration control unit 101, the indicator control unit 102, and the positional information control unit 103 on the information appliance controller 10. Also, the network information storage unit 104 can be constituted by the auxiliary storage unit 19.

Figure 4:
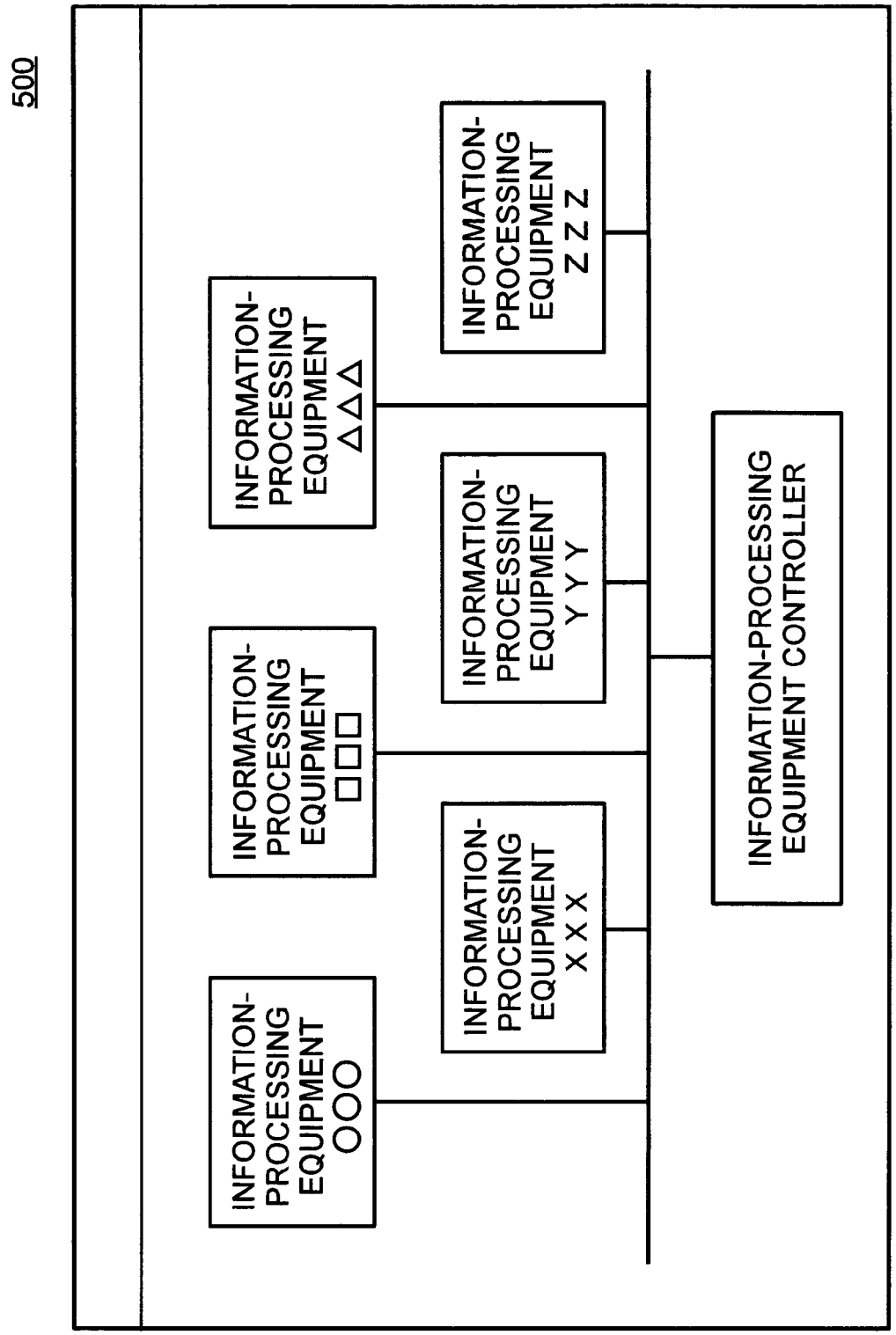
FIG. 4 is a view showing an example of a screen illustrating a configuration of a network.

On the basis of information stored in the network information storage unit 104, the network configuration control unit 101 creates image data of a screen depicting a configuration of the network 1, an example of which is shown in FIG. 4, to have the same displayed on the display unit 17. The screen can be displayed on the basis of, for example, instructions of displaying from a user. Alternatively, the screen may be displayed as a default screen of the display unit 17.

As shown in the figure, schematically displayed in block form on a screen 500 depicting a configuration of the network 1 are nomenclatures of the information appliance 20 present in the network 1 controlled by the information appliance controller 10. Thereby, a user becomes able to easily grasp a configuration of the network 1. Also, as described later, by selecting a block of a particular information appliance 20 on the screen with the use of an input unit such as mouse or the like, it is possible to instruct a processing for the corresponding information appliance 20. In addition, identifiers may be displayed in addition to nomenclatures of the respective information appliance 20.

Figure 5:
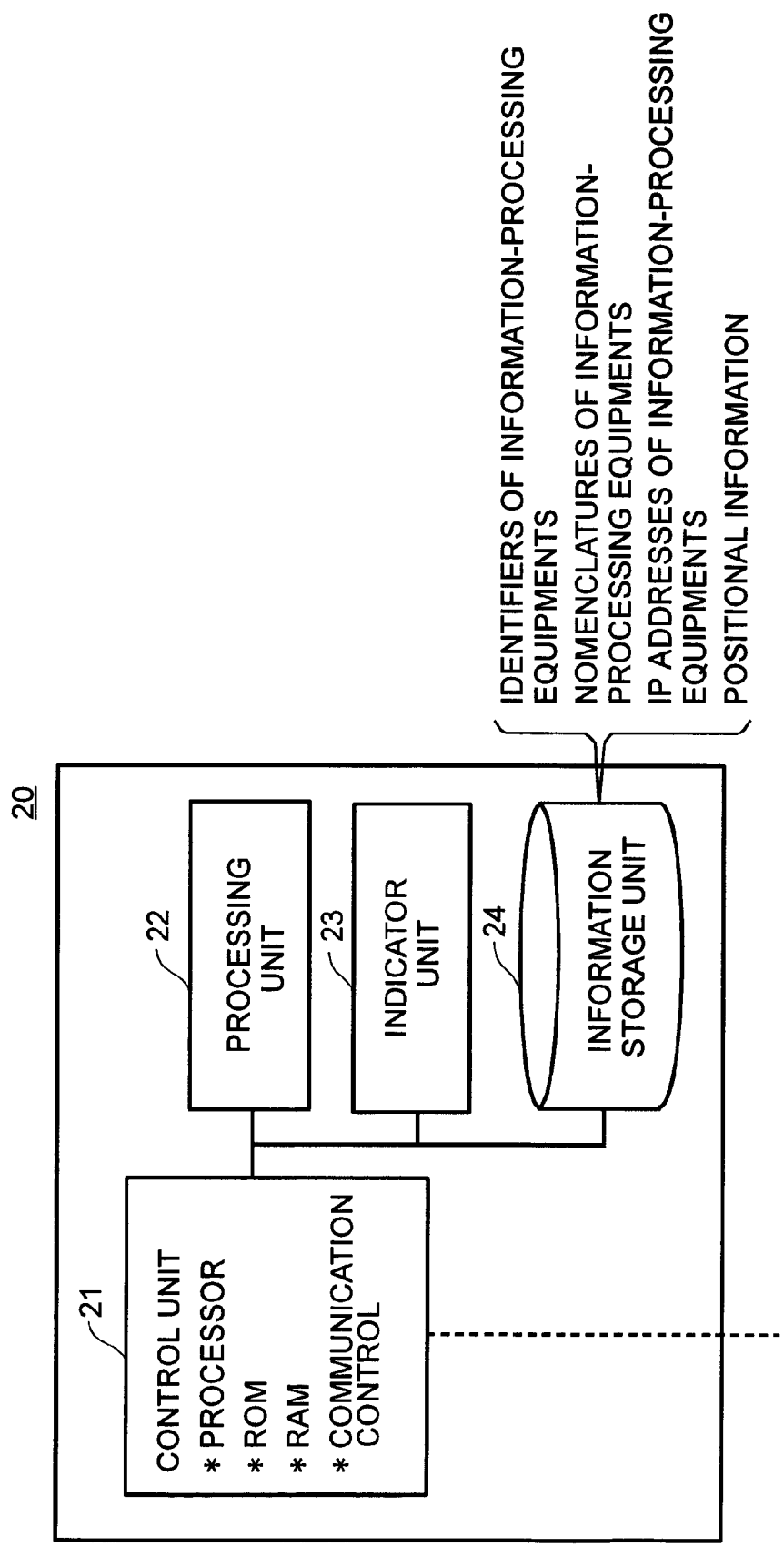
FIG. 5 is a block diagram showing a configuration and function of an information appliance.
Figure 6:
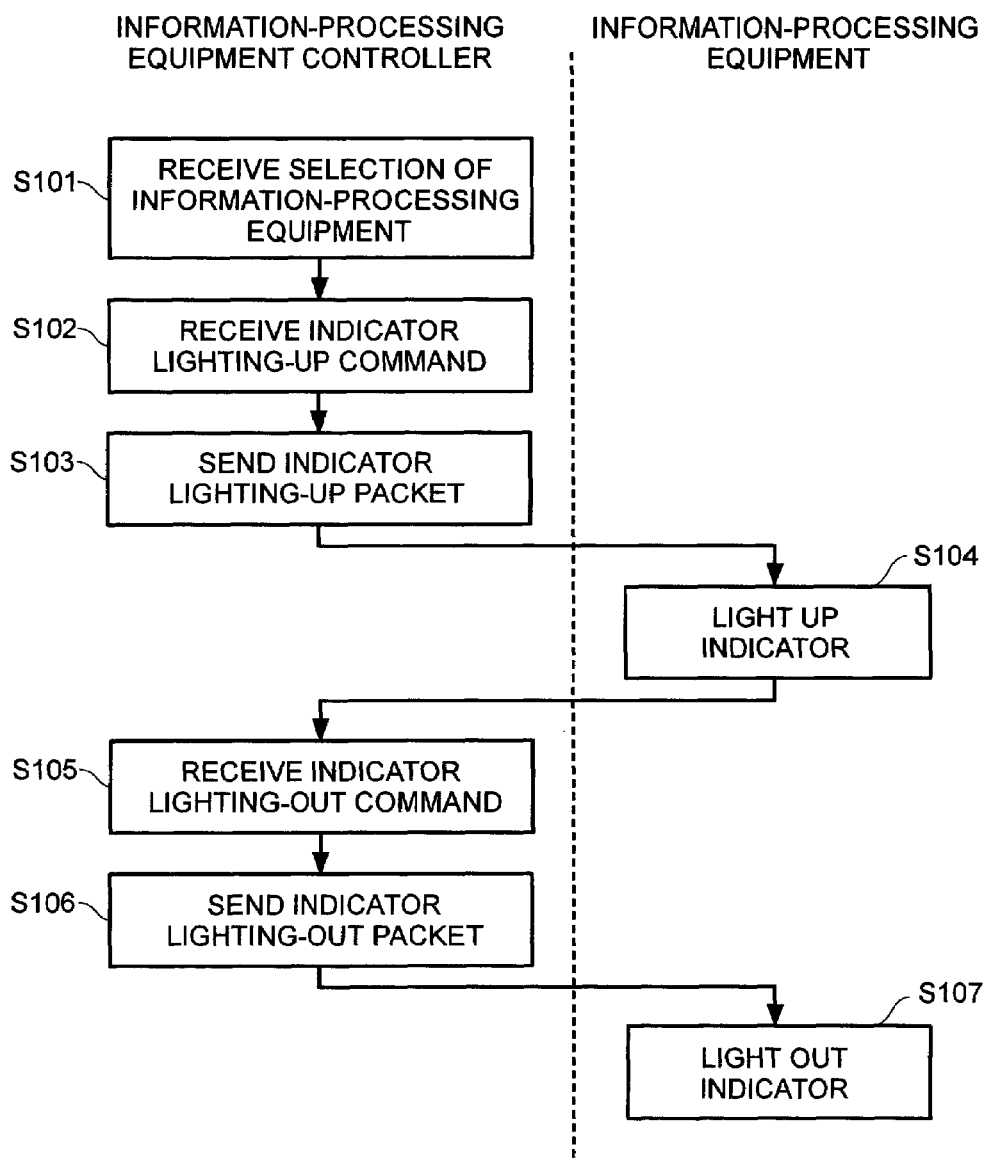
FIG. 6 is a flowchart illustrating a first embodiment of the invention.

FIG. 5 is a block diagram showing a configuration and function of the information appliance 20. As shown in the figure, the information appliance 20 comprises a control unit 21, a processing unit 22, an indicator unit 23, and an information storage unit 24.

The control unit 21 comprises a processor, ROM, RAM, a communication control device, or the like, and the processor implements a program code recorded in the ROM whereby the control unit controls an information processing in the information appliance 20, and connects the information appliance 20 to the network 1 to control a processing for giving and receiving various information from other appliance. In the case where information household electrical appliances are used as the information appliance 20, the control unit 21 can be composed of, for example, micro-controllers.

The processing unit 22 serves as a locus for performing a proper processing of the respective information appliance 20. For example, in the case of using televisions as the information appliance 20, radio wave is received and a processing for image displaying is performed, and in the case of using refrigerators as the information appliance 20, a processing is performed for cooling an interior thereof. Also, personal computers are used as the information appliance 20, a processing is performed for functioning as information-processing devices. In this case, such function overlaps a function of the control unit 21.

The indicator unit 23 serves as a locus for indicating that the information appliance 20 are responsive, and can be constituted by a lighting device, for example, LED (light emitting diode), or the like. In this case, the lighting device is lighted on whereby it is possible to indicate that the information appliance 20 are responsive. However, this is not limitative provided that a user can recognize that the information appliance 20 are responsive. For example, a sounding device, such as speakers, or the like, a vibrating device, and so on may be used. An explanation will be given below by way of a lighting device. The indicator unit 23 can perform a lighting-on processing and a lighting-off processing upon receipt of instructions from the control unit 21.

The information storage unit 24 stores information with respect to the information appliance 20 in a nonvolatile manner. For example, a semiconductor storage unit such as memory cards, or the like, can be used to constitute the information storage unit 24. Alternatively, a device, such as DIP switches, for storing information mechanically set may be used.

That information with respect to the information appliance 20, which is stored by the information storage unit 24, can include, for example, IP addresses allotted to the information appliance 20, identifiers of the information appliance 20, nomenclatures of the information appliance 20, and positional information of the information appliance 20.

For IP addresses among the information, when the information appliance 20 are connected to the network 1, IP addresses allotted by the network configuration control unit 101 of the information appliance controller 10 are acquired by the control unit 21 and stored in the information storage unit 24.

Identifiers of the information appliance 20 and nomenclatures of the information appliance 20 are set by, for example, a user. While a way of setting is optional, such identifiers and nomenclatures can be stored in a predetermined format in that semiconductor storage unit, which constitutes the information storage unit 24, with the use of, for example, a drive unit for the semiconductor storage unit. Of course, setting may be made by connecting an input unit, such as a keyboard, or the like, to the information appliance 20 and using the information appliance 20. Also, in the case where the information storage unit 24 is constituted by a DIP switch, identifiers and nomenclatures may be set in a predetermined switching pattern. Alternatively, identifiers and nomenclatures set for the information appliance 20 by a user with the use of the information appliance controller 10 may be acquired by the control unit 21 and stored in the information storage unit 24.

Also, for identifiers of the information appliance 20 and nomenclatures of the information appliance 20, a manufacture may set beforehand proper identifiers and general nomenclatures of the information appliance 20.

A user who has installed the information appliance 20 sets positional information of the information appliance 20. In the case of using information household electrical appliances as the information appliance 20, positional information is represented by strings indicative of sites, for example, "living room", "bed room", "children's room", or the like, in which the information appliance 20 are placed, or codes representative thereof. Also, in the case of using computers in an office as the information appliance 20, positional information can be represented by strings indicative of names and posts of users, or codes. In the case of using codes to represent positional information, it is desirable to provide a table representing correspondence between codes and strings within the network 1 and to convert codes into strings when displayed on the display unit 17, or the like. Thereby, a user can easily recognize positional information.

In addition, information stored as positional information is not limited to a physical position or positions but properties, for example, purchase time, production number, model number, or the like, peculiar to the information appliance 20 may be recorded in accordance with a user's intention.

Setting of positional information can be made with the use of, for example, a semiconductor storage unit, DIP switch, or the like, in the same manner as identifiers and nomenclatures. Also, in the case where sites, at which the information appliance 20 are installed, are changed, positional information is to be reset.

An explanation will be given to a first embodiment of the invention with reference to a flowchart shown in FIG. 5.

In the embodiment, the information appliance controller 10 first receives selection of a particular information appliance 20 in the network 1 from a user (S101). While a way to receive selection of a information appliance 20 is optional, the input unit 18 such as mouse, or the like, on a screen 500 showing, for example, a configuration of the network 1 shown in FIG. 4 can be used to receive designation of a block corresponding to a particular information appliance 20. Also, a keyboard may be used to receive nomenclatures of the information appliance 20.

When receiving an indicator lighting-on command in a state, in which a particular information appliance 20 is selected (S102), the indicator control unit 102 of the information appliance controller 10 sends a packet for lighting-on of an indicator, to the selected information appliance 20 (S103).

The indicator lighting-on command can be received by a predetermined key operation, a menu operation, or the like. Also, the packet for lighting up an indicator stores an IP address of the information appliance controller 10 as sender information and an IP address of the selected information appliance 20 as destination information with reference to the network information storage unit 104. And a data unit of packets stores a predetermined command cord for lighting up an indicator.

When receiving the packet, the control unit 21 of the information appliance 20 designated as a destination follows the command cord to have the indicator unit 23 performing a lighting-on processing (S104).

Thereafter, when receiving a lighting-off command (S105), the indicator control unit 102 of the information appliance controller 10 sends a packet for lighting-off of an indicator to the selected information appliance 20 (S106).

When receiving the packet, the control unit 21 of the information appliance 20 designated as a destination follows the command cord to have the indicator unit 23 performing a lighting-off processing (S107). In addition, the control unit 21 of the information appliance 20 may build therein a timer function to have the indicator unit 23 performing a lighting-off processing after lighting-on for a predetermined time even in the case where a lighting-off packet is not received.

Also, with an arrangement, in which a predetermined key on the input unit 18 of the information appliance controller 10 is defined as an indicator lighting-on button, an indicator lighting-on command is sent upon depression of the key, and an indicator lighting-off command is sent after the depression, the indicator unit 23 of a particular information appliance 20 is lighted on while the key is depressed.

According to the first embodiment of the invention, it is possible to have a particular information appliance 20 performing a response processing such as lighting-on, lighting-off, or the like, a user can recognize where the particular information appliance 20 among a plurality of information appliance 20 present in the network 1 is physically present.

Figure 7:
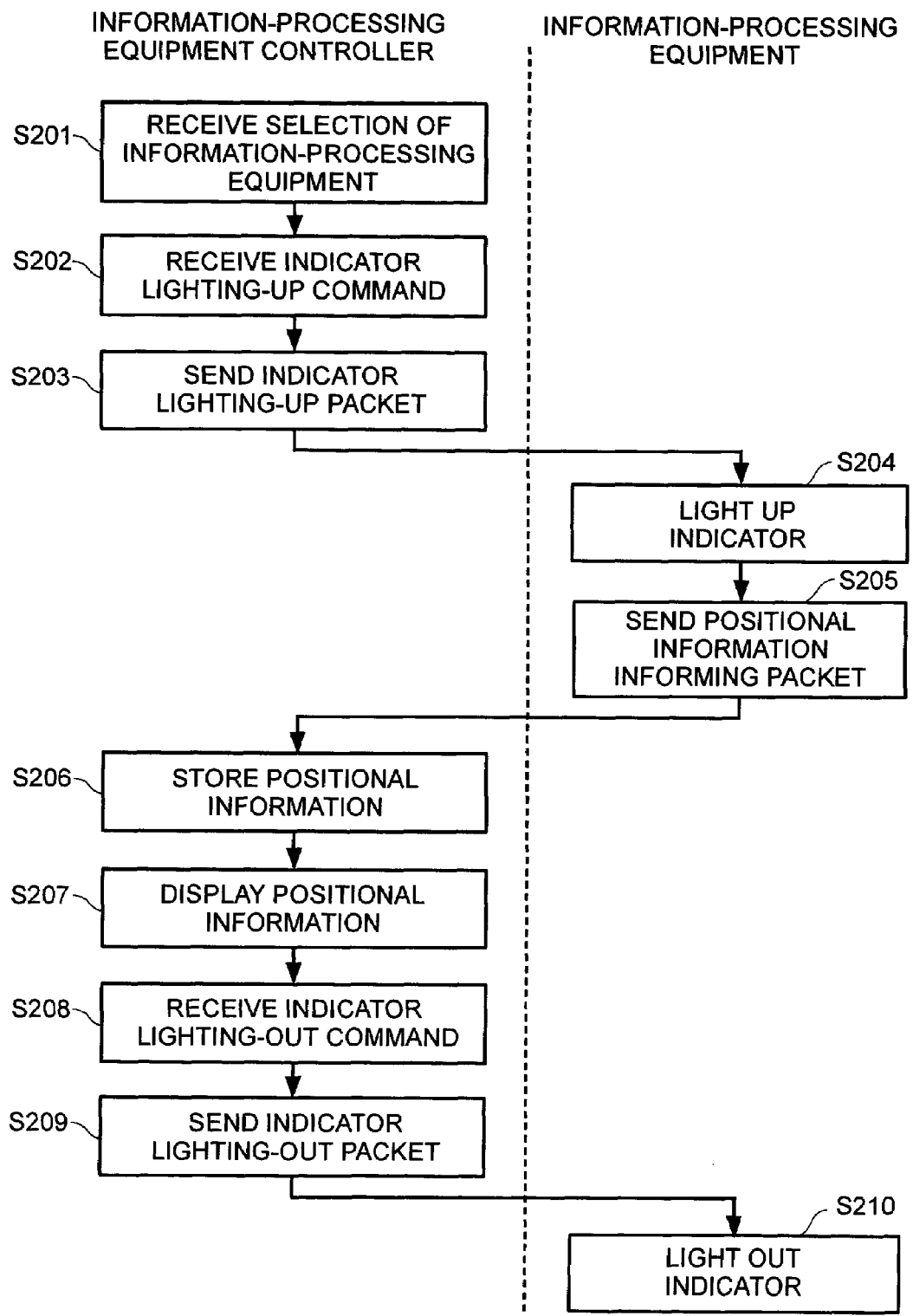
FIG. 7 is a flowchart illustrating a second embodiment of the invention.

An explanation will be given to a second embodiment of the invention with reference to a flowchart shown in FIG. 7.

Also, in the embodiment, the information appliance controller 10 first receives selection of a particular information appliance 20 in the network 1 from a user (S201).

When receiving an indicator lighting-on command in a state, in which a particular information appliance 20 is selected (S202), the indicator control unit 102 of the information appliance controller 10 creates and sends a packet for lighting-on of an indicator, to the selected information appliance 20 (S203).

When receiving the packet, the control unit 21 of the information appliance 20 designated as a destination follows a command cord to have the indicator unit 23 performing a lighting-on processing (S204).

And as a response to the received packet, a packet for notice of positional information is created on the basis of positional information stored in the information storage unit 24 to be sent to the information appliance controller 10 (S205).

The packet for notice of positional information stores an IP address thereof stored in the information storage unit 24 as sender information and an IP address of the information appliance controller 10 as destination information. And a data unit of packets stores a cord indicative of the packet for notice of positional information, and data indicative of positional information.

When receiving the packet, the network configuration control unit 101 of the information appliance controller 10 stores positional information contained in the packet in connection with identifiers, nomenclatures, and IP addresses of corresponding information appliance 20 in the network information storage unit 104 (S206).

Figure 8:
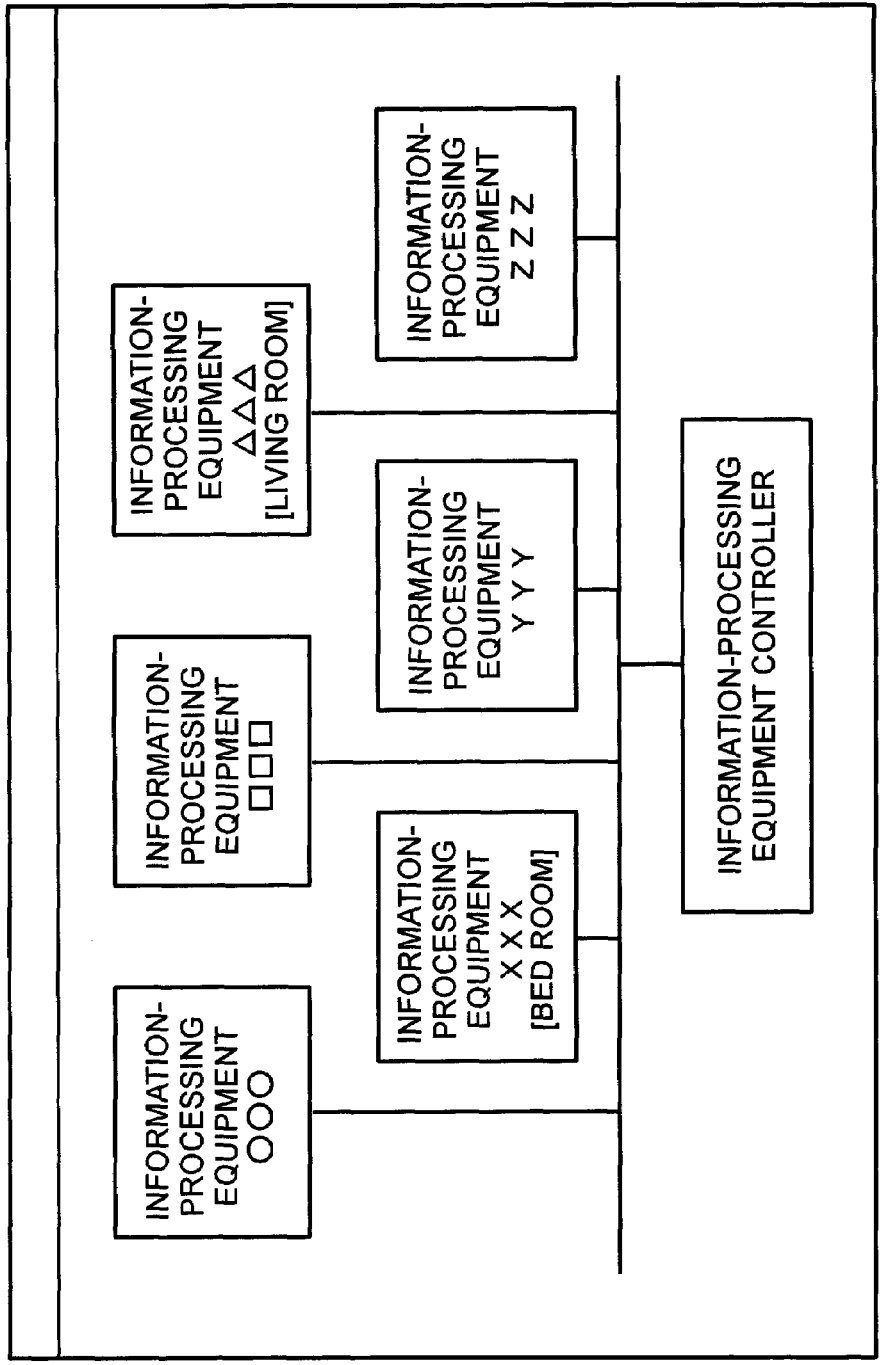
FIG. 8 is a view showing an example of a screen illustrating a configuration of a network.

And as shown exemplarily in FIG. 8, blocks of the corresponding information appliance 20 on a screen 520 showing a configuration of the network 1 contain and display the received positional information (S207).

Thereafter, when receiving a lighting-off command (S208), the indicator control unit 102 of the information appliance controller 10 sends a packet for lighting-off of an indicator to the selected information appliance 20 (S209).

When receiving the packet, the control unit 21 of the information appliance 20 designated as a destination follows a command cord to have the indicator unit 23 performing a lighting-off processing (S210).

According to the second embodiment of the invention, by acquiring positional information from a particular information appliance 20 to display the same on a screen, a user becomes easy to recognize where a particular information appliance 20 among a plurality of information appliance 20 present in the network 1 is physically present.

Figure 9:
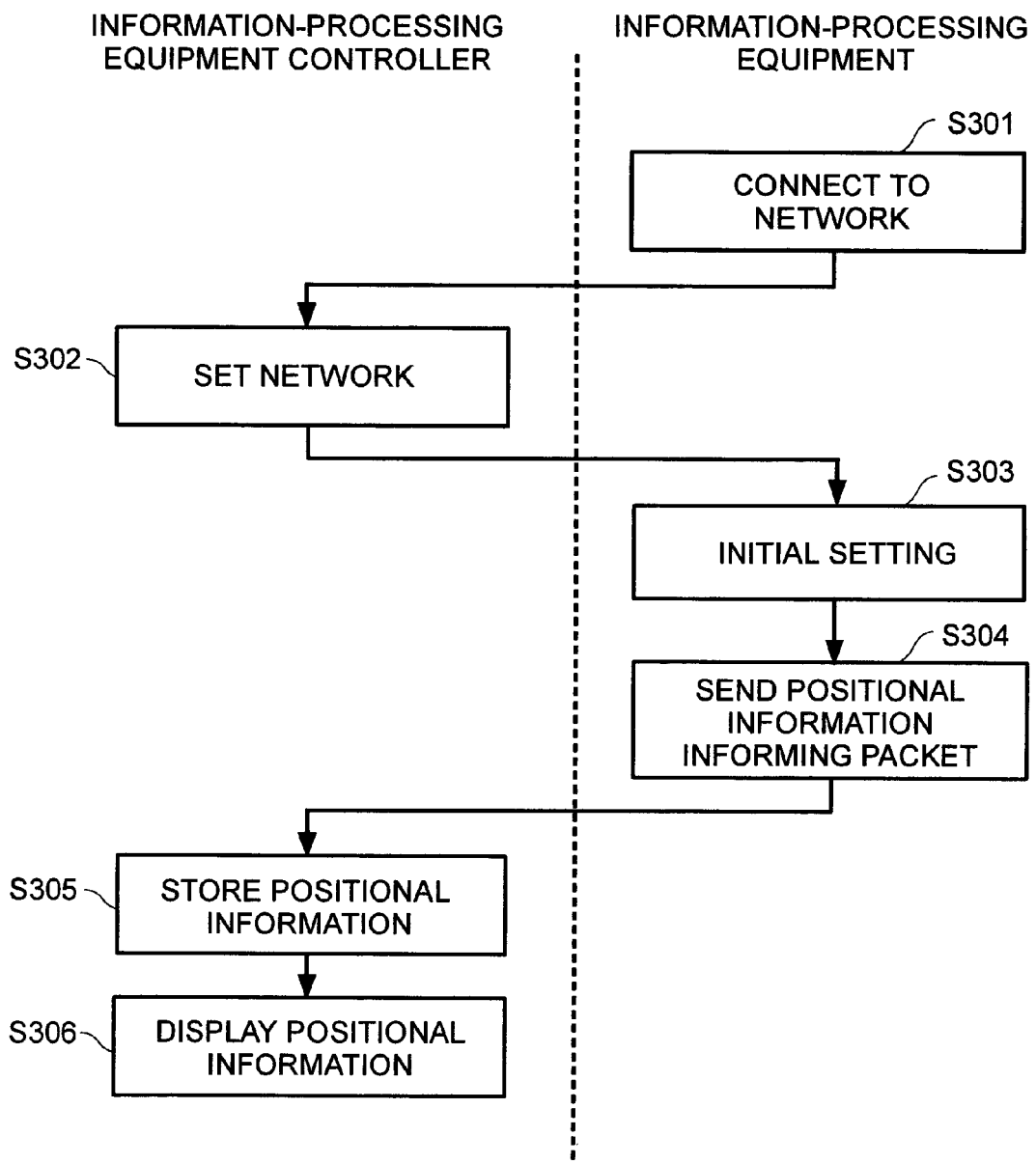
FIG. 9 is a flowchart illustrating a third embodiment of the invention.

An explanation will be given to a third embodiment of the invention with reference to a flowchart shown in FIG. 9.

With the embodiment, a processing is started when information appliance 20 are connected to a network 1 (S301). In addition, it is assumed that setting of identifiers, nomenclatures, and positional information for the information appliance 20 has been completed.

The network configuration control unit 101 of the information appliance controller 10 sets a network for the information appliance 20 as connected (S302). Concretely, IP addresses are allotted to the information appliance 20 to be stored in the network information storage unit 104 in connection with identifiers and nomenclatures of the information appliance 20.

Also, the information appliance 20 perform initial setting such as storage of IP addresses allotted by the information appliance controller 10 in the information storage units 24 (S303).

And the control units 21 of the information appliance 20 create packets for notice of positional information, on the basis of positional information stored in the information storage units 24 to send the same to the information appliance controller 10 (S304).

When receiving the packets, the network configuration control unit 101 of the information appliance controller 10 stores positional information contained in the packets in connection with identifiers, nomenclatures, and IP addresses of corresponding information appliance 20 in the network information storage unit 104 (S305).

Figure 10:
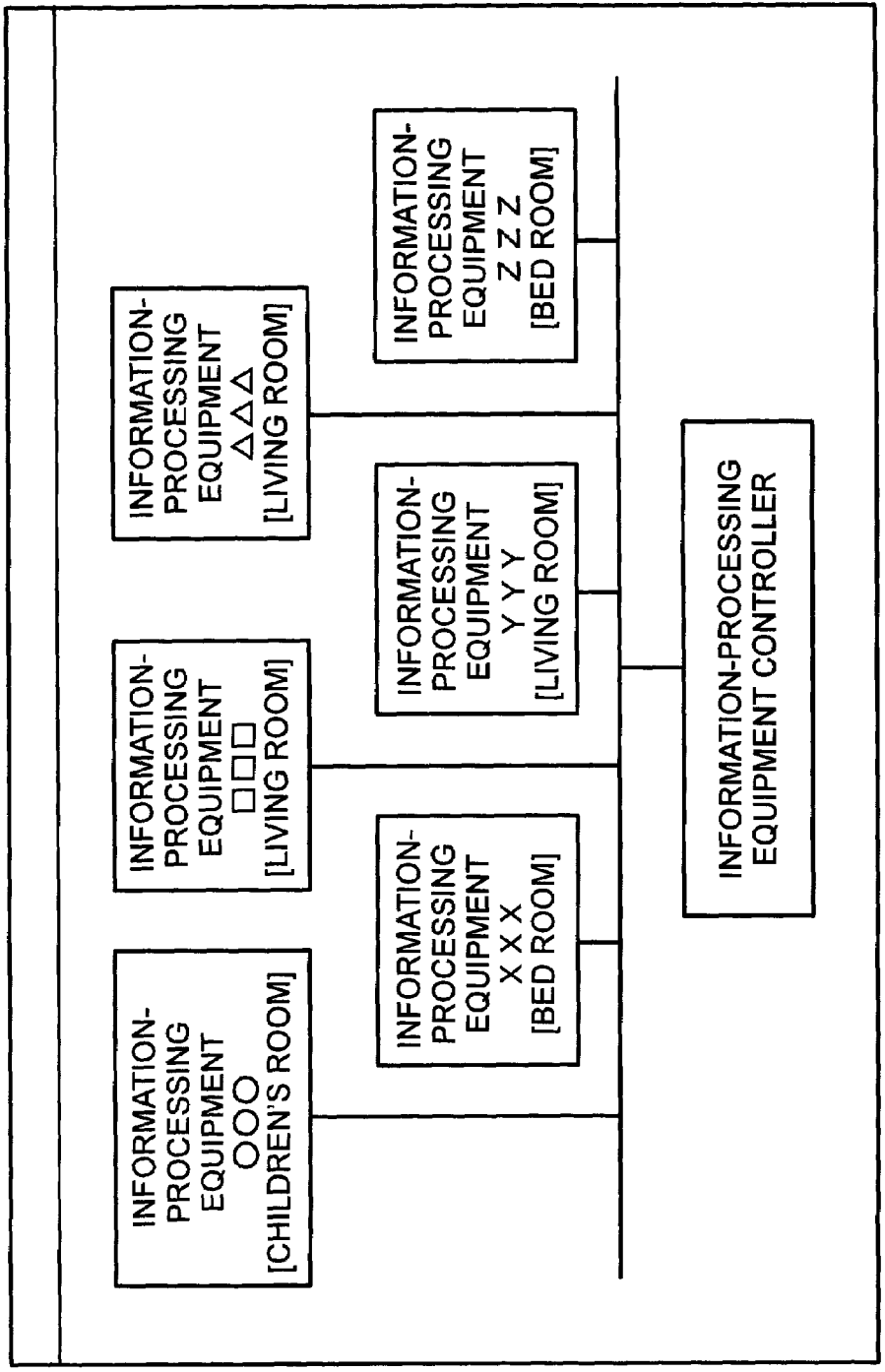
FIG. 10 is a view showing an example of a screen illustrating a configuration of a network.

And as shown exemplarily in FIG. 10, blocks of the information appliance 20 on a screen 540 showing a configuration of the network 1 contain and display the received positional information (S306).

According to the third embodiment of the invention, positional information for all the information appliance 20 present in the network 1 can be displayed on a screen.

Figure 11:
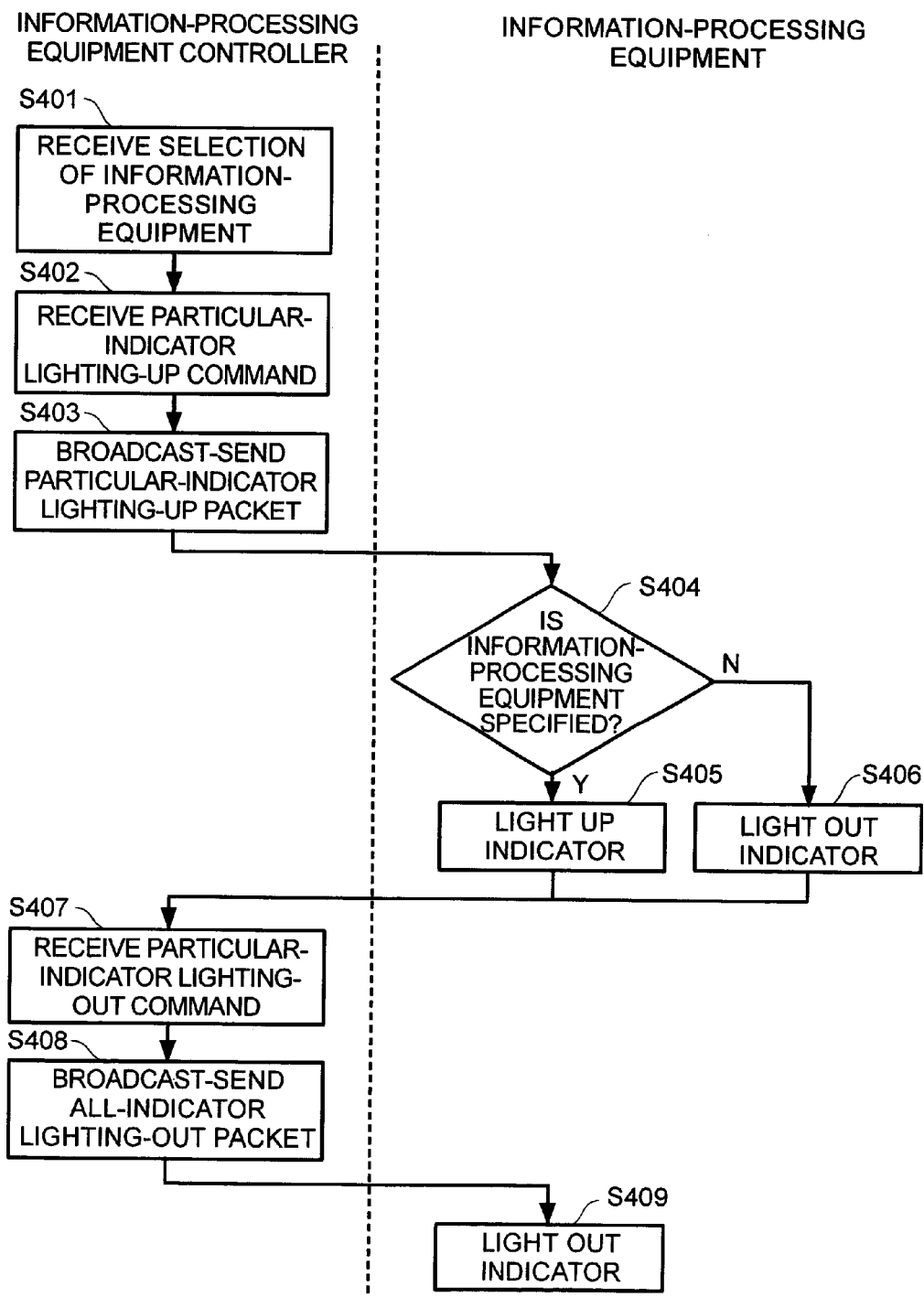
FIG. 11 is a flowchart illustrating a fourth embodiment of the invention.

An explanation will be given to a fourth embodiment of the invention with reference to a flowchart shown in FIG. 11.

In the embodiment, the information appliance controller 10 first receives selection of a particular information appliance 20 in the network 1 from a user (S401).

When receiving a particular-indicator lighting-on command in a state, in which a particular information appliance 20 is selected (S402), the indicator control unit 102 of the information appliance controller 10 broadcast-sends a packet for lighting-on of the particular indicator, to all the information appliance 20 (S403).

The particular-indicator lighting-on command is one for having the specified information appliance 20 performing a processing for lighting-on of an indicator and for having other information appliance 20 than the specified information appliance performing a processing for lighting-off of indicators. The particular-indicator lighting-on command can be received by way of a predetermined key operation, a menu operation, or the like.

A packet for lighting-on of a particular indicator stores an IP address of the information appliance controller 10 as sender information and a cord indicative of broadcast transmission as destination information. And a data unit of packets stores a cord indicative of a particular-indicator lighting-on command and an IP address (or identifier) of the selected information appliance 20. In addition, multicast transmission for all the information appliance 20 may be made instead of broadcast transmission.

When receiving the packet, the control units 21 of the respective information appliance 20 determine whether an IP address (or identifier) contained in the data unit indicates the control units themselves (S404).

As a result, when a control unit itself is specified (S404:Y), it has the indicator unit 23 performing a lighting-on processing (S405).

Meanwhile, when a control unit itself is not specified (S404:N), it has the indicator unit 23 performing a lighting-off processing (S406). At this time, in the case where the indicator unit 23 is in a lighting-off state, the state is maintained.

Thereafter, when receiving an all-indicator lighting-off command (S407), the indicator control unit 102 of the information appliance controller 10 broadcast-sends a packet for lighting-off of all the indicators, to all the information appliance 20 (S408).

The all-indicator lighting-off command is one for having all the information appliance 20 performing a processing for lighting-off of an indicator. A packet for lighting-on of a particular indicator stores an IP address of the information appliance controller 10 as sender information and a cord indicative of broadcast transmission as destination information. And a data unit of packets stores a cord indicative of an all-indicator lighting-off command.

When receiving the packet, the control units 21 of the respective information appliance 20 have the indicator units 23 performing a lighting-off processing (S409). At this time, in the case where the indicator units 23 are in a lighting-off state, the state is maintained.

In addition, with an arrangement, in which a predetermined key on the input unit 18 of the information appliance controller 10 is defined as a particular-indicator lighting-on button, a particular-indicator lighting-on command is sent upon depression of the key, and an all-indicator lighting-off command is sent after the depression, only the indicator unit 23 of a particular information appliance 20 is lighted on while the key is depressed.

According to the fourth embodiment of the invention, it is possible to obtain a state, in which an information appliance 20, of which an indicator or indicators are lighted on, are lighted off and only a particular information appliance 20 is lighted on. Thereby, a user becomes further easy to recognize where a particular information appliance 20 among a plurality of information appliance 20 present in the network 1 is physically present. Also, in the case where results as expected are not obtained, it is easy to find malfunctioning of the indicator units 23, or the like, of the information appliance 20.

As described above, according to the invention, it is possible to easily recognize physical positions of information appliance in a network composed of a plurality of information appliance.

What is claimed is:

1. A network system comprising:
a plurality of information appliances; and
a control system,
wherein the control system comprises:
response control means for receiving selection of an information appliance and response instructions from a user and sending a response command to the selected information appliance,
wherein each information appliance comprises:
response means for implementing a response processing, and information appliance control means for receiving a response command which causes the response means to implement a response processing, wherein the response means of the information appliance comprises:
a lighting device for implementing a lighting-on processing,
wherein when receiving selection of an information appliance and particular response instructions from a user, the response control means of the control system sends a particular response command, which contains information for specifying the selected information appliance, to all the information appliances included in the network system, and
wherein the information appliance control means has the response means implement a lighting-on processing of the lighting device if the information for specifying the information-processing, contained in the received particular response command, is indicative of the information appliance, and has the response means implement a lighting-off processing of the lighting device if the information for specifying the information-processing is not indicative of the information.

2. The network system according to claim 1, wherein the control system further comprises:
network information storage means for storing information appliance identifying information for identifying the respective information appliance; and
network control means for creating image data to display information appliance included in the network system based on the information appliance identifying information stored in the network information storage means.

3. The network system according to claim 2, wherein the information appliance further comprises:
information appliance information storage means for storing information peculiar to the information appliance,
wherein when receiving the response command, the information appliance control means sends the information peculiar to the information appliance, stored in the information appliance information storage means, to the control system, and
wherein the network control means of the control system stores the received information peculiar to the information appliance, in the network information storage means in connection with the information appliance identifying information of the information appliance, and creates image data to display the information appliance included in the network system, adding thereto information peculiar to the corresponding information appliance.

4. The network system according to claim 3, wherein the information peculiar to the information appliance includes geographical, positional information of the information appliance.

5. A control system for controlling a network system provided with a plurality of information appliance, each of which includes response means for implementing a response processing, and information appliance control means for having the response means implement a response processing, the control system comprising:
response control means to receive selection of an information appliance and response instructions from a user to send a response command to the selected information appliance,
wherein the response means of the information appliance comprises:
a lighting device for implementing a lighting-on processing,
wherein when receiving selection of an information appliance and particular response instructions from a user, the response control means of the control system sends a particular response command, which contains information for specifying the selected information appliance, to all the information appliances included in the network system, and
wherein the information appliance control means has the response means implement a lighting-on processing of the lighting device if the information for specifying the information-processing, contained in the received particular response command, is indicative of the information appliance, and has the response means implement a lighting-off processing of the lighting device if the information for specifying the information-processing is not indicative of the information.

6. The control system according to claim 5, further comprising:
network information storage means for storing information appliance identifying information for identifying the respective information appliance, and network control means for creating image data to display information appliance included in the network system on the basis of the information appliance identifying information stored in the network information storage means.

7. The control system according to claim 6, wherein when receiving information peculiar to the information appliance, the network control means of the control system stores the information in the network information storage means in connection with the information appliance identifying information of the information appliance, and creates image data to display the information appliance included in the network system, adding thereto information peculiar to the corresponding information appliance.

8. The control system according to claim 5, wherein when receiving selection of an information appliance and response stoppage instructions from a user, the response control means sends a response command to the selected information appliance.

9. The control system according to claim 5, wherein when receiving selection of an information appliance and particular response instructions from a user, the response control means sends a particular response command, which contains information for specifying the selected information appliance, to all the information appliance included in the network system.

10. The control system according to claim 9, wherein when receiving all-response stoppage instructions from a user, the response control means sends an all-response stoppage command to all the information appliance included in the network system.

11. An information appliance connected to a network controlled by a control system, the information appliance comprising:
response means for implementing a response processing; and
information appliance control means for receiving a response command from the control system to have the response means implementing a response processing,
wherein the response means of the information appliance comprises:
a lighting device for implementing a lighting-on processing,
wherein when receiving selection of an information appliance and particular response instructions from a user, the response control means of the control system sends a particular response command, which contains information for specifying the selected information appliance, to all the information appliances included in the network system, and wherein the information appliance control means has the response means implement a lighting-on processing of the lighting device if the information for specifying the information-processing, contained in the received particular response command, is indicative of the information appliance, and has the response means implement a lighting-off processing of the lighting device if the information for specifying the information-processing is not indicative of the information.

12. The information appliance according to claim 11, further comprising:
information appliance information storage means for storing information peculiar to the information appliance,
wherein when receiving the response command from the control system, the information appliance control means sends the information peculiar to the information appliance, stored in the information appliance information storage means, to the control system.

13. The information appliance according to claim 11, further comprising:
information appliance information storage means for storing information peculiar to the information appliance,
wherein when the information appliance is connected to the network, the information appliance control means sends the information peculiar to the information appliance, stored in the information appliance information storage means, to the control system.

14. The information appliance according to claim 13, wherein the information peculiar to the information appliance include geographical, positional information of the information appliance.

15. The information appliance according claim 14, wherein the response means comprises:
a lighting device for implementing a lighting-on processing.

16. The information appliance according to claim 15, wherein when receiving response stoppage instructions from the control system, the information appliance control means has the response means implementing a lighting-off processing of the lighting device.

17. The information appliance according to claim 16, wherein when receiving all-response stoppage instructions from the control system, the information appliance control means has the response means implementing a lighting-off processing of the lighting devices.

18. The information appliance according to claim 13, wherein the response means comprises:
a lighting device for implementing a lighting-on processing.

19. The information appliance according to claim 18, wherein when receiving response stoppage instructions from the control system, the information appliance control means has the response means implementing a lighting-off processing of the lighting device.

20. The information appliance according to claim 18, wherein when receiving particular response instructions from the control system, the information appliance control means has the response means implementing a lighting-on processing of the lighting device in the case where the information for specifying the information appliance, contained in the received particular response command, is indicative of the information appliance, and has the response means implementing a lighting-off processing of the lighting device in the case except the above case.

21. The information appliance according to claim 20, wherein when receiving all-response stoppage instructions from the control system, the information appliance control means has the response means implementing a lighting-off processing of the lighting devices.

22. A storage unit having stored therein a program implementable in information-processing apparatus for controlling a network system provided with a plurality of information appliances, said program comprising:
response means for implementing a response processing; and
information appliance control means for receiving a response command to have the response means implement response processing,
wherein the program having the information-processing apparatus implementing a response control processing, in which selection of an information appliance and response stoppage instructions are received from a user, and a response command is sent to the selected information appliances,
wherein the response means comprises:
a lighting device for implementing a lighting-on processing,
wherein when receiving selection of an information appliance and particular response instructions from a user, the response control processing sends a particular response command, which contains information for specifying the selected information appliance, to all the information appliances included in the network system, and
wherein the response means implement a lighting-on processing of the lighting device if the information for specifying the information-processing, contained in the received particular response command, is indicative of the information appliance, and has the response means implement a lighting-off processing of the lighting device if the information for specifying the information-processing is not indicative of the information.

* * * * *